Patented Oct. 13, 1942

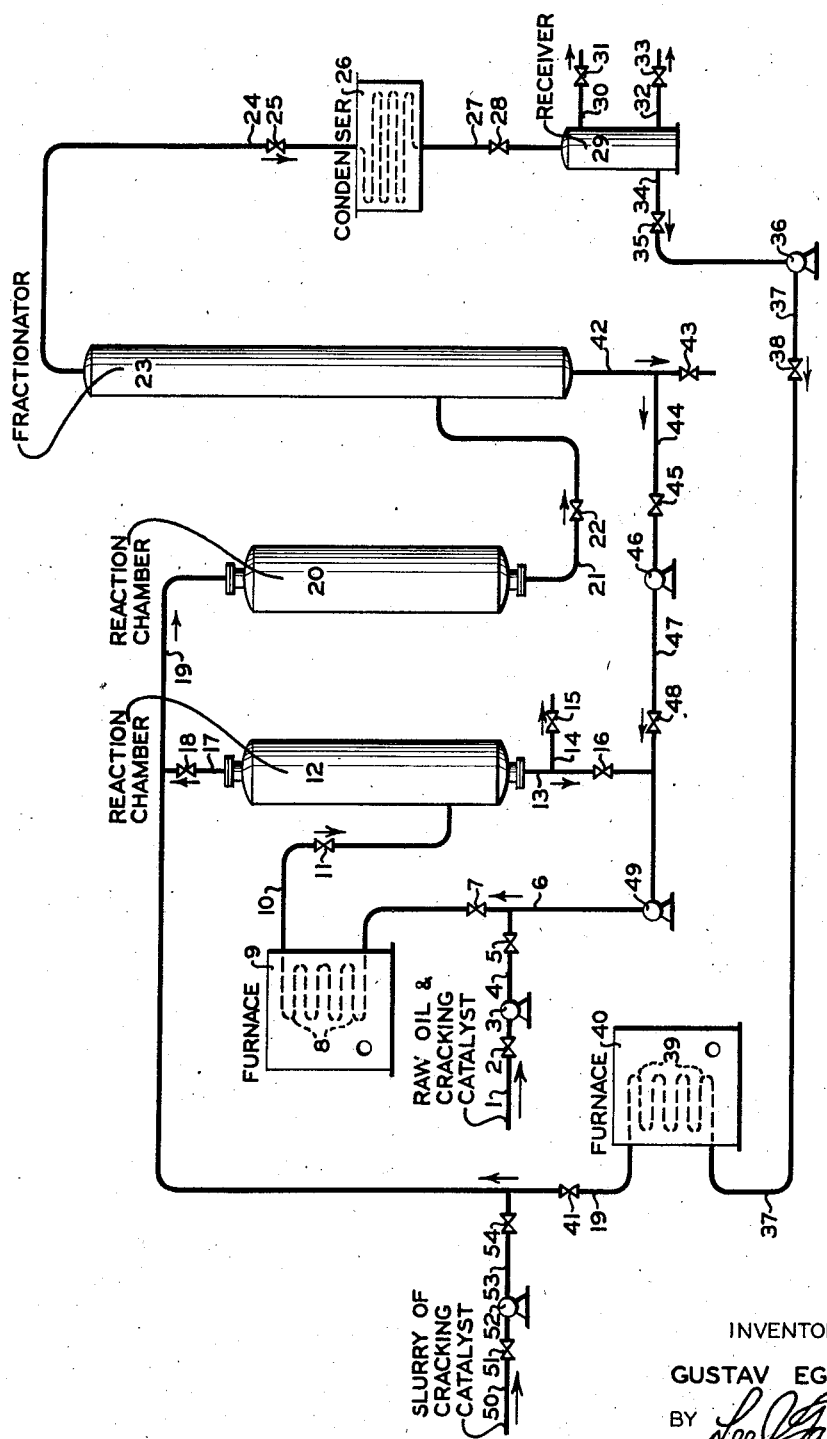

2,298,355

UNITED STATES PATENT OFFICE 2,298,355

CATALYTIC CRACKING OF HYDROCARBONS

Gustav Egloff, Chicago, Ill., assignor to Universal Oil Products Company, Chicago, Ill., a corporation of Delaware Application September 20, 1940, Serial No. 357,512

3 Claims. (Cl. 196—49)

This invention relates to a process for converting a hydrocarbon oil into valuable products, including high antiknock gasoline, by the treatment of said hydrocarbon oil with a powdered catalytic agent under suitable conditions to bring about cracking thereof.

The use of catalytic agents to assist the thermal decomposition of hydrocarbon oils of petroleum origin into high yields of gasoline has been practiced for some time. Among the catalytic agents that have been employed are the reduced metal catalysts including iron, cobalt, nickel, etc., which are subject to a number of disadvantages, including the fact that they are poisoned by sulfur compounds, which may be present in oils undergoing conversion and furthermore that they tend to promote gas- and carbon-forming reactions with subsequent low yields of desirable products and short life of the catalyst. Another type of cracking catalyst is the activated earth type in which naturally occurring clays are used after having been treated with acids or other chemicals to increase their catalytic activity. These activated clays have the advantage of low cost but do not have the chemical activity of the synthetic silica-alumina type catalyst which is the preferred type of catalyst in this invention.

The preferred type of catalyst in this invention comprises composites of the type of silica-alumina, silica-zirconia, and silica-alumina-zirconia which are manufactured by the precipitation of the component compounds followed by washing, drying and calcining steps. These synthetic catalysts are prepared under such conditions that alkali metal ions are substantially eliminated in order to obtain adequate catalytic activity and stability.

In one specific embodiment my invention comprises a process for the production of a motor fuel comprising subjecting a combined feed formed as hereinafter set forth to the action of a powdered cracking catalyst under conditions suitable for the formation of substantial quantities of motor fuel, separating the products of said catalytic cracking step into a vaporous fraction and a higher boiling liquid fraction containing the used catalyst in suspenson, commingling the aforesaid vaporous fraction with gasoline formed in the process and subjecting said mixture to the action of a cracking catalyst to form further quantities of gasoline, fractionating the products from said second catalytic step to separate a normally gaseous fraction, gasoline, and a higher boiling liquid fraction containing used catalyst in suspension, commingling a portion of said gasoline fraction with the vaporous fraction separated from the first catalytic step for treatment as hereinbefore set forth, commingling the higher boiling liquid fractions separated from the products of the two catalytic steps with the raw oil charging stock to form the combined feed for the process as hereinbefore set forth.

The process is illustrated in diagrammatic form in the attached drawing which has not been made to scale nor has any attempt been made to proportionate the various parts of the equipment. A hydrocarbon oil, such as a distillate fraction of petroleum, crude oil, or topped crude together with the required amount of powdered cracking catalyst to form a suspension is introduced to the system through line 1, valve 2 and by means of pump 3 is introduced to line 4 controlled by valve 5. The raw oil charging stock is supplied from line 4 to line 6 wherein it is commingled with recycle streams, the origin of which will be subsequently described. The resulting combined feed of raw oil and recycle streams passes through valve 7 and enters heating coil 8 so disposed as to receive heat from furnace 9. The primary cracking zone as illustrated in the drawing may consist of a heating coil followed by a reaction chamber, although any type of reactor adaptable to use with a powdered catalyst may be used. A vertical type of reactor containing contacting members such as baffles and bubble trays may be used in the place of that shown in the drawing. The heated oil is discharged from coil 8 into line 10 controlled by valve 11 from which it is supplied to reaction chamber 12. The coil and the reaction chamber may operate at a temperature within the range of about 500 to about 1100° F. and a pressure of the order of 20–1000 pounds per square inch. The exact choice of conditions will depend upon the type of stock being processed and the character of the product which is to be obtained. For example, when operating at relatively elevated pressures of the order of 100–1000 pounds per square inch and at a temperature of about 500–900° F. a substantially olefin-free gasoline is obtained. When operating at temperatures in excess of 900° F. an olefinic type of gasoline is produced. The latter type usually has a somewhat higher octane number while the former type of gasoline is more suitable for use in aviation fuels due to relatively higher susceptibility to increase in octane number with addition of tetraethyl lead.

Reaction chamber 12 also operates to separate vapors from the liquid. The liquid separated from the product of the reaction contains the major portion of the used catalyst in the form of a suspension and is removed from reaction chamber 12 by way of line 13. A portion of this liquid and used catalyst is removed from the system by way of line 14 controlled by valve 15. The remainder and greater portion of the liquid and used catalyst is directed through valve 16 from which it is directed to line 47 and supplied to pump 49 which discharges into line 6 wherein it is commingled with the raw oil charging stock to form the combined feed for heating coil 8. The vapors separated from reaction chamber 12 are removed therefrom by way of line 17 controlled by valve 18 from which they are supplied to line 19. These vapors are commingled in line 19 with a recycle stream of gasoline formed in the process. A further supply of cracking catalyst is introduced to the system by way of line 50 controlled by valve 51 from which it enters pump 52 which discharges into line 53 controlled by valve 54. Line 53 discharges into line 19 wherein the cracking catalyst is commingled with the gasoline vapors and the vapors separated from reaction chamber 12, the resulting mixture then being supplied to a second reaction chamber 20. The same general range of temperatures and pressures referred to in the discussion of the operation of reaction chamber 12 are also applicable to reaction chamber 20. In one method of operation the temperature in reaction chamber 20 is somewhat lower than in reaction chamber 12. The purpose of this particular method of operation is to produce a more saturated product. The reactions taking place in reaction chamber 20 which operates to produce a saturated product include dehydrocyclization with formation of aromatic hydrocarbons and the liberation of hydrogen or the hydrogenation of the olefinic constituents. The products of reaction chamber 20 including used catalyst are removed by way of line 21 and after passing through valve 22 enter fractionating column 23.

In fractionating column 23 gasoline boiling range hydrocarbons and normally gaseous products are removed as an overhead by way of line 24 and after passing through valve 25 enter cooler and condenser 26. The mixture of normally liquid products together with uncondensed and undissolved vapors is removed from cooler and condenser 26 by way of line 27 and after passing through valve 28 enters receiver 29 wherein the liquid product is separated from the uncondensed and undissolved vapors. This gaseous fraction is removed from receiver 29 by way of line 30 controlled by valve 31 and is collected as a product of the process. A portion of the gasoline collected in receiver 29 is removed by way of line 32 controlled by valve 33 and also constitutes a product of the process. A portion of the gasoline collected in receiver 29, the portion varying from about 10 to 50% of the gasoline formed, is removed by way of line 34 controlled by valve 35 and enters pump 36 discharging into line 37 controlled by valve 38. This gasoline is then supplied to heating coil 39 so disposed as to receive heat from furnace 40. The gasoline leaves heating coil 39 at a temperature within the range of approximately 800 to 1100° F. and a pressure varying from about 20 to 1000 pounds per square inch. It is discharged into line 19 and after passing through valve 41 is commingled with the vapors separated in reaction chamber 12 and with cracking catalyst supplied by way of line 53 and the resulting mixture is directed to reaction chamber 20 for treatment as hereinbefore set forth.

The higher boiling liquid product separated in fractionator 23 is removed by way of line 42. This liquid contains used catalyst in suspension. A portion of this used catalyst is withdrawn from the system by directing part of the slurry through valve 43. The remainder and greater portion of this higher boiling liquid is directed from line 42 to line 44 controlled by valve 45 from which it is supplied to pump 46 discharging into line 47. After passing through valve 48 this higher boiling liquid fraction is commingled with the liquid fraction obtained from reaction chamber 12. This mixture of liquids is supplied to pump 49 discharging into line 6 where it is commingled with raw oil charging stock to form the combined feed for heating coil 8 for treatment as hereinbefore set forth.

The following example is given to illustrate the usefulness and practicability of my process but should not be construed as limiting it to the exact conditions indicated therein.

A California topped crude of 21.2 A. P. I. gravity will be used in this illustration. To produce results to be described, the primary reaction chamber is operated at a temperature of 975° F. and a pressure of 200 pounds per square inch while the secondary reaction chamber operates at substantially the same pressure and temperature of 825° F. The combined feed entering the heating coil preceding the primary reaction chamber contains an amount of catalyst equal to 2% by weight of the oil while the secondary reaction chamber carries a quantity of catalyst equivalent to 3% by weight of the combined feed. The total quantity of 400° end point gasoline obtainable is equal to 60% of 79 octane number.

I claim as my invention:

1. A process for the production of a high octane motor fuel comprising subjecting a raw oil charging stock to catalytic cracking in the presence of a suspended catalyst to form substantial quantities of motor fuel, separating the products of said reaction into a vaporous fraction and a liquid fraction containing the used catalyst in suspension, commingling the aforesaid vaporous fraction, including the components thereof heavier than gasoline, with gasoline fractions formed as hereinafter set forth and subjecting the resulting mixture to catalytic cracking in the presence of a suspended catalyst to form further quantities of gasoline, fractionating the products from the catalytic treatment of said mixture to separate a normally gaseous fraction, gasoline, and a higher boiling liquid fraction containing used catalyst in suspension, and commingling a portion of the last-named gasoline with the vaporous fraction separated from the products of the first cracking reaction for treatment in the manner hereinbefore set forth.

2. A process for the production of a motor fuel comprising subjecting hydrocarbon oil to catalytic cracking in the presence of a suspended powdered cracking catalyst to form substantial quantities of motor fuel, separating the reaction products into a vaporous fraction and a higher boiling liquid fraction containing the used catalyst in suspension, commingling at least a portion of the aforesaid vaporous fraction with gasoline fractions formed as hereinafter set forth and subjecting the resultant mixture to catalytic cracking in the presence of a suspended cracking catalyst to form further quantities of gasoline, fractionating the products from said second catalytic step to separate a normally gaseous fraction, gasoline, and a higher boiling liquid fraction containing used catalyst in suspension, supplying a portion of the last-named gasoline to said second catalytic step for treatment as hereinbefore set forth, and supplying at least a portion of the higher boiling catalyst-containing liquid fraction separated from the products of the second catalytic step to the first-mentioned catalytic step.

3. A process for the production of a motor fuel which comprises subjecting a combined feed formed as hereinafter set forth in the presence of a suspended powdered cracking catalyst in a heating coil to conditions suitable for the formation of substantial quantities of motor fuel, charging the products from the heating coil to an adiabatic reaction chamber for further reaction to form motor fuel, simultaneously withdrawing from said reaction chamber a vaporous fraction and a liquid fraction containing the used catalyst in suspension, commingling the aforesaid vaporous fraction with gasoline formed in the process and charging said mixture to a second adiabatic reaction chamber with a suspended powdered cracking catalyst to form further quantities of motor fuel, fractionating the products from said second reaction chamber to separate a normally gaseous fraction, gasoline, and a higher boiling liquid fraction containing the used catalyst in suspension, commingling a portion of the gasoline with the vaporous fraction separated from the first reaction chamber for treatment as hereinbefore set forth, and commingling the higher boiling catalyst-containing liquid fraction separated from the products of the second reaction chamber with the catalyst-containing liquid fraction separated from the first reaction chamber and the raw oil charging stock to form the combined feed for the process for treatment as hereinbefore set forth.

GUSTAV EGLOFF.